W. I. WOOSTER.
Automatic Gates.
No. 5,489. Reissued July 15, 1873.
Fig I
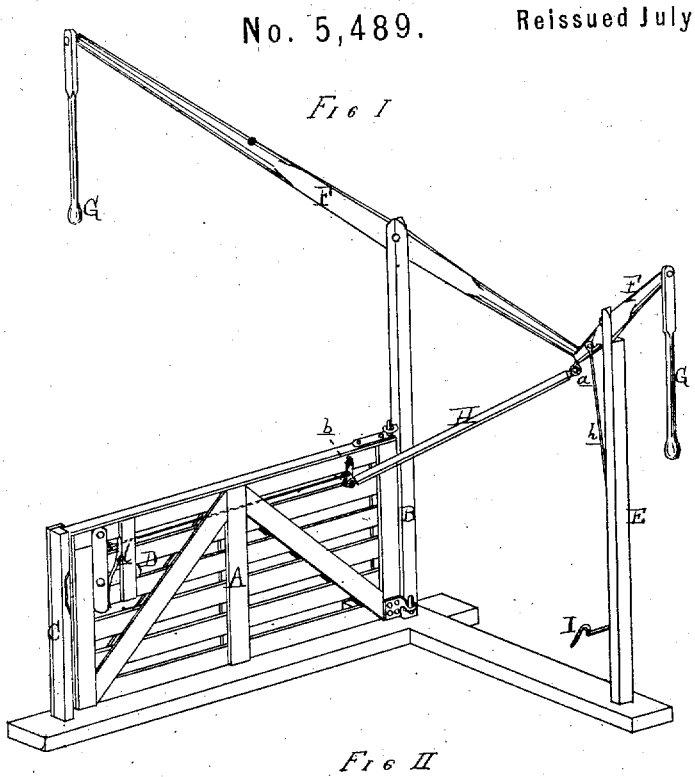
Fig II
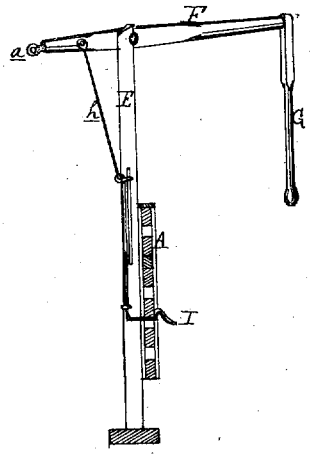
Attest
H. S. Sprague
H. F. Ellerts
Inventor
Wm. I. Wooster
By Atty
Geo. H. Sprague

UNITED STATES PATENT OFFICE.

WILLIAM I. WOOSTER, OF HARVARD, ILLINOIS.

IMPROVEMENT IN AUTOMATIC GATES.

Specification forming part of Letters Patent No. 136,892, dated March 18, 1873; reissue No. 5,489, dated July 15, 1873; application filed June 20, 1873.

*To all whom it may concern:*

Be it known that I, WILLIAM I. WOOSTER, of Harvard, in the county of McHenry and State of Illinois, have invented a new and useful Improvement in Gates; and I do declare that the following is a true and accurate description thereof, reference being had to the accompanying drawings and to the letters of reference marked thereon, and being a part of this specification, in which—

Figure 1 is a perspective view, and Fig. 2 is a vertical section, of the gate, secured in an open position by the spring-catch.

Like letters refer to like parts in each figure.

The invention consists in the combination of a latch with a wire lever and post, as will be fully described hereinafter.

In the accompanying drawing, A represents a gate constructed in the ordinary manner, and suspended from the post B by the necessary pintles or hinges, and, when closed, is secured to the post C by the latch D. The post B, as well as the post E, should be about twice the height of ordinary gate-posts, and the latter should be set in line with the former, and about the gate's length from it. To the top of these posts B E are pivoted the levers F, from the outer ends of which are pendent the handles G, while the inner ends of the levers are connected together by a link or hook, *a*, from which they are connected with the gate by means of a rod, H, one end of which is hooked to the link *a*, while the other is connected with the gate by the link *b*. From this link *b* a wire or cord extends to the latch D. I is a latch, so secured to the post E as to engage with and hold open the gate when the latter is swung against the post.

The gate being closed, the rider in approaching from either direction pulls down on either of the handles G which are pendent over the road-way, and elevates the opposite ends of the levers F, which opens the gate, at the same time withdrawing the latch D from the post C. The gate swings open against the post E, where the latch I secures it until the rider has passed through, when a slight pull of the other pendent handle releases the latch and the gate closes, it being hung so as to do so by its own weight. When closed the small spring *d* compels the latch D to engage with the post C and secure the gate.

The latch I is operated by means of a connecting-wire, *h*, extending from said latch to one of the levers F.

What I claim as my invention, and desire to secure by Letters Patent, is—

1. The latch I, in combination with the wire *h*, lever F, and post E, for the purposes set forth.

2. The combination of the handles G, levers F, posts B E, rod H, link *a*, latch I, and wire *h* with a gate, substantially as and for the purposes described.

3. The combination of the gate, post C, latch D and connecting-wire, link *b*, rod H, link *a*, levers F, posts B E, and handles G, when the parts are arranged to operate substantially as and for the purposes specified.

4. The arrangement of the gate A, posts B C E, latch D, levers F, handles G, rod H, latch I, links *a b*, and springs *d*, when the parts are constructed and combined to operate substantially as and for the purposes set forth.

WILLIAM I. WOOSTER.

Witnesses:

CHARLES ARMSTRONG,

JAMES S. GRIFFIN.